United States Patent
Rowe et al.

(10) Patent No.: US 12,047,016 B2
(45) Date of Patent: Jul. 23, 2024

(54) ARTIFICIAL MUSCLE ACTUATORS COMPRISING ELECTRODES WITH AN INSULATION BILAYER

(71) Applicant: Toyota Motor Engineering & Manufacturing North America, Inc., Plano, TX (US)

(72) Inventors: Michael P. Rowe, Pinckney, MI (US); Michael Jones, Orchard Lake, MI (US); Shardul S. Panwar, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 744 days.

(21) Appl. No.: 16/931,549

(22) Filed: Jul. 17, 2020

(65) Prior Publication Data
US 2022/0021314 A1   Jan. 20, 2022

(51) Int. Cl.
*H02N 1/00* (2006.01)
*F03G 7/00* (2006.01)

(52) U.S. Cl.
CPC .......... *H02N 1/006* (2013.01); *F03G 7/0121* (2021.08)

(58) Field of Classification Search
CPC ..... H02N 1/006; F03G 7/0121; F15B 15/103; F15B 21/065; F15B 2015/208; F15B 2211/885; B25J 9/1075; B25J 19/00
USPC ........................................................ 310/309
See application file for complete search history.

(56) References Cited

U.S. PATENT DOCUMENTS

| | | | |
|---|---|---|---|
| 3,724,043 A * | 4/1973 | Eustance | H01G 4/222 29/25.42 |
| 7,679,261 B2 | 3/2010 | Chappaz et al. | |
| 8,288,917 B2 * | 10/2012 | Nakatsuka | H01G 7/02 310/309 |
| 10,233,910 B2 | 3/2019 | Mazzeo et al. | |
| 2009/0115285 A1 * | 5/2009 | Najafi | F15B 7/00 29/25.35 |
| 2011/0236702 A1 | 9/2011 | Busch et al. | |

(Continued)

FOREIGN PATENT DOCUMENTS

| CN | 209812321 U | 12/2019 |
|---|---|---|
| CN | 110696459 A | 1/2020 |

(Continued)

OTHER PUBLICATIONS

Shoa et al., "Surfaceflow: large area haptic display via compliant liquid dielectric actuators", Mar. 28-31, 2020, 2020 IEEE haptics symposium (HAPTICS) (Year: 2020).*

(Continued)

*Primary Examiner* — Eric Johnson
(74) *Attorney, Agent, or Firm* — Dinsmore & Shohl LLP

(57) ABSTRACT

An artificial muscle actuator that includes a housing, a dielectric fluid housed within the housing, and an electrode pair positioned in the housing. The electrode pair includes a first electrode and a second electrode. The first electrode and the second electrode each include a metal film. The first electrode includes an insulation bilayer disposed on the metal film of the first electrode in an orientation facing the second electrode. In addition, the insulation bilayer includes an acryl-based polymer layer disposed on the metal film and a biaxially oriented polypropylene (BOPP) layer disposed on the acryl-based polymer layer.

19 Claims, 7 Drawing Sheets

(56) References Cited

U.S. PATENT DOCUMENTS

| | | | |
|---|---|---|---|
| 2012/0228991 A1 | 9/2012 | Vranish | |
| 2012/0287556 A1* | 11/2012 | Silvi | H01B 3/426 |
| | | | 428/141 |
| 2014/0212603 A1* | 7/2014 | Zhou | B05D 5/10 |
| | | | 428/32.22 |
| 2016/0060403 A1* | 3/2016 | Mahood | C08L 69/00 |
| | | | 264/495 |
| 2017/0100924 A1* | 4/2017 | Read | B32B 38/06 |
| 2018/0265655 A1* | 9/2018 | Sanner | B32B 15/08 |
| 2019/0315047 A1* | 10/2019 | Tominaga | C08J 7/06 |
| 2020/0032822 A1* | 1/2020 | Keplinger | F15B 21/065 |
| 2021/0003149 A1* | 1/2021 | Keplinger | F15B 15/10 |
| 2021/0316446 A1* | 10/2021 | Leroy | G06F 3/014 |
| 2022/0021314 A1* | 1/2022 | Rowe | H02N 1/006 |
| 2022/0158570 A1* | 5/2022 | Keplinger | B32B 27/08 |

FOREIGN PATENT DOCUMENTS

| | | |
|---|---|---|
| JP | H09204818 A | 8/1997 |
| JP | 2007097292 A | 4/2007 |
| WO | 2017005280 A1 | 1/2017 |
| WO | 2019002860 A1 | 1/2019 |
| WO | 2019173227 A1 | 9/2019 |

OTHER PUBLICATIONS

Shane Mitchell, et al., "An Easy-To-Implement Toolkit To Create Versatile And High-Performance HASEL Actuators For Untethered Soft Robots," Journal Article, Advanced Science 6(14):1900178, Jun. 2019, URL: https://www.researchgate.net/figure/Generalized-principle-of-zipping-mode-actuation-in-HASEL-actuators-As-voltage-is_fig1_333725822, 15 pages.

Nicholas Kellaris, et al., "Peano-HASEL Actuators: Muscle-Mimetic, Electrohydraulic Transducers That Linearly Contract On Activation," Science Robotics Research Article, Jan. 5, 2018, vol. 3, Issue 14, eaar3276, URL: https://robotics.sciencemag.org/content/3/14/eaar3276.full?intcmp=trendmd-rob.

E. Acome, et al., "Hydraulically Amplified Self-Healing Electrostatic Actuators With Muscle-Like Performance," Science Journal, Jan. 5, 2018: vol. 359, Issue 6371, pp. 61-651, Department of Mechanical Engineering & Materials Science and Engineering Program, University of Colorado, Boulder, CO 80309, USA.

* cited by examiner

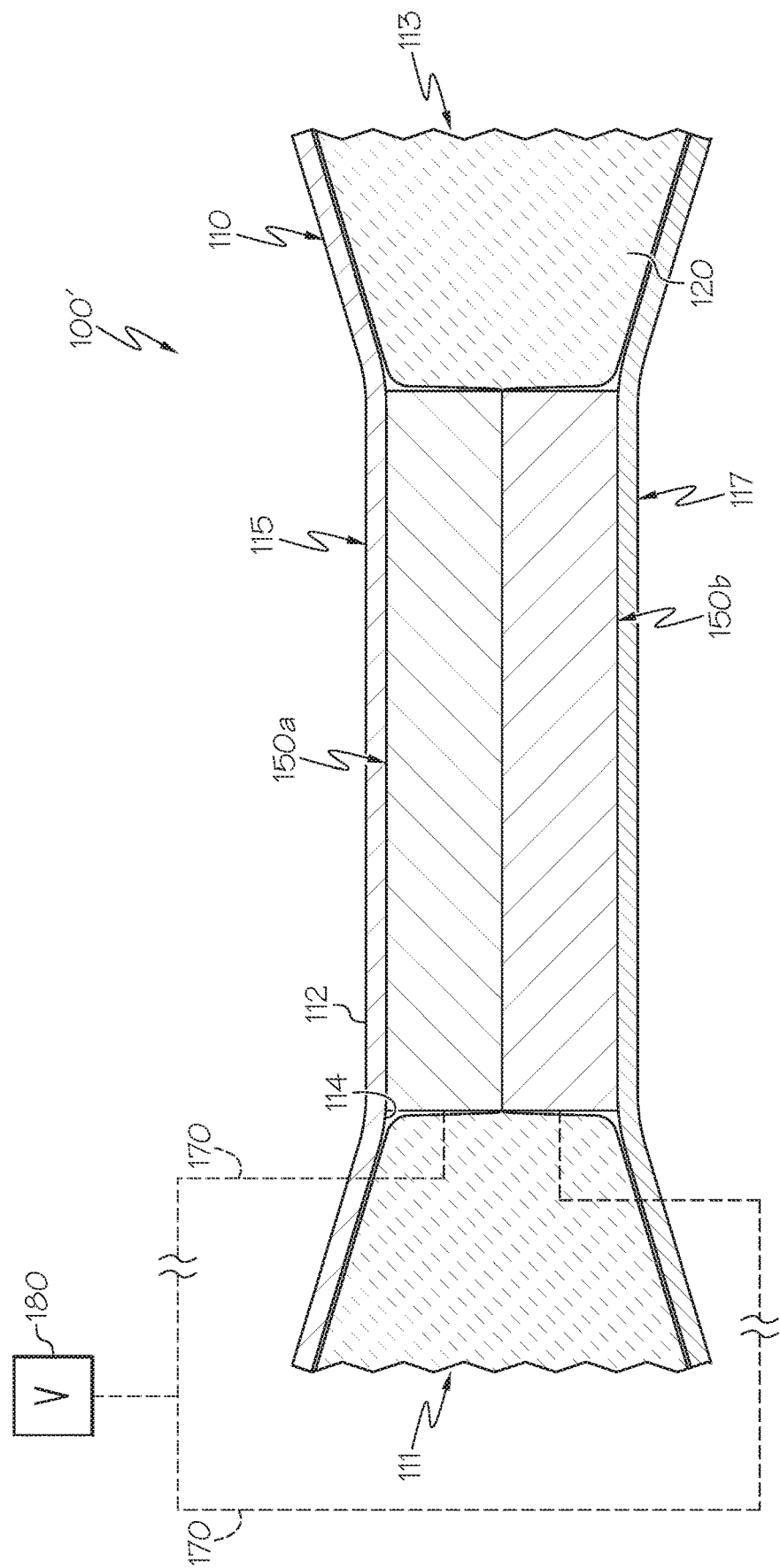

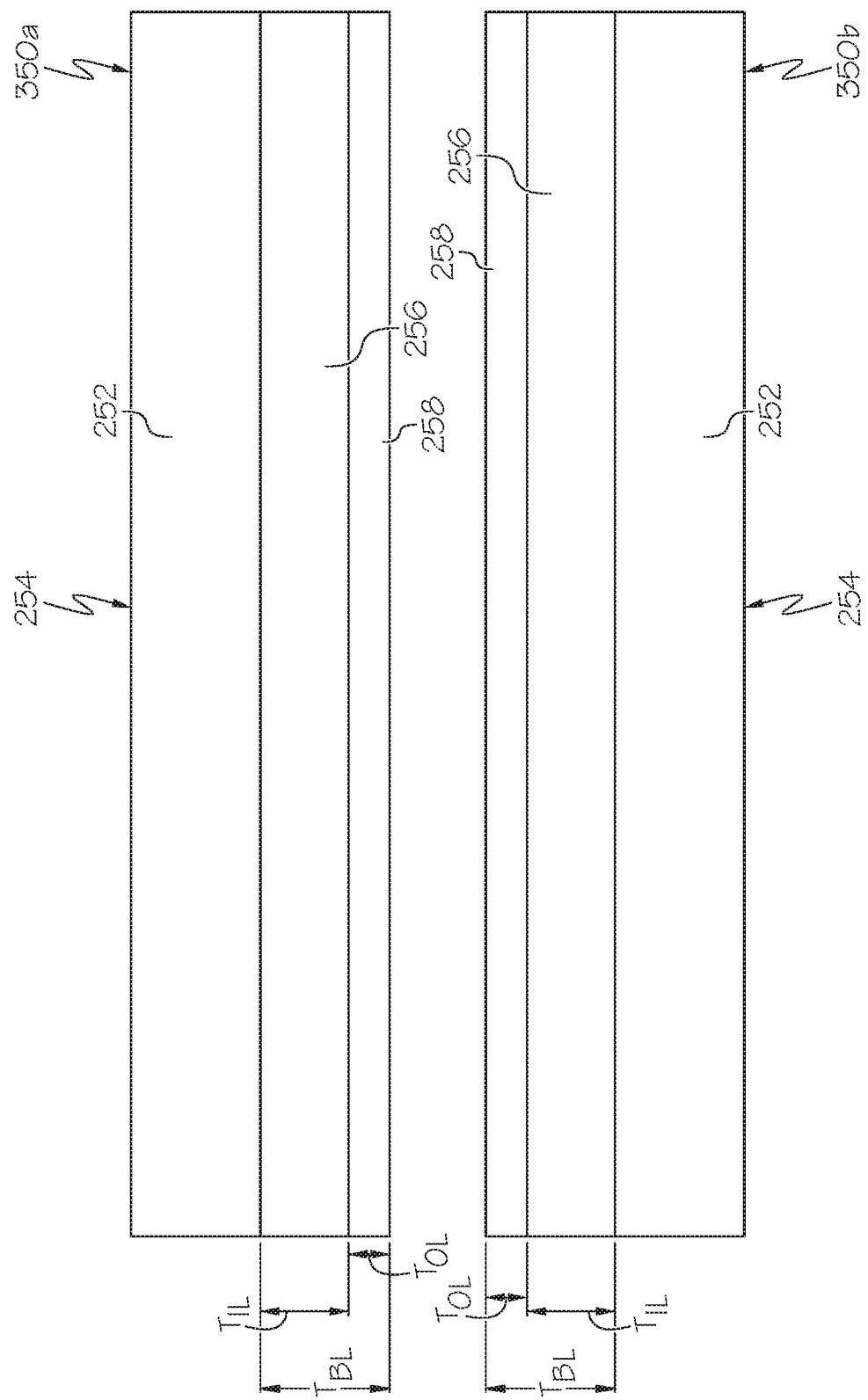

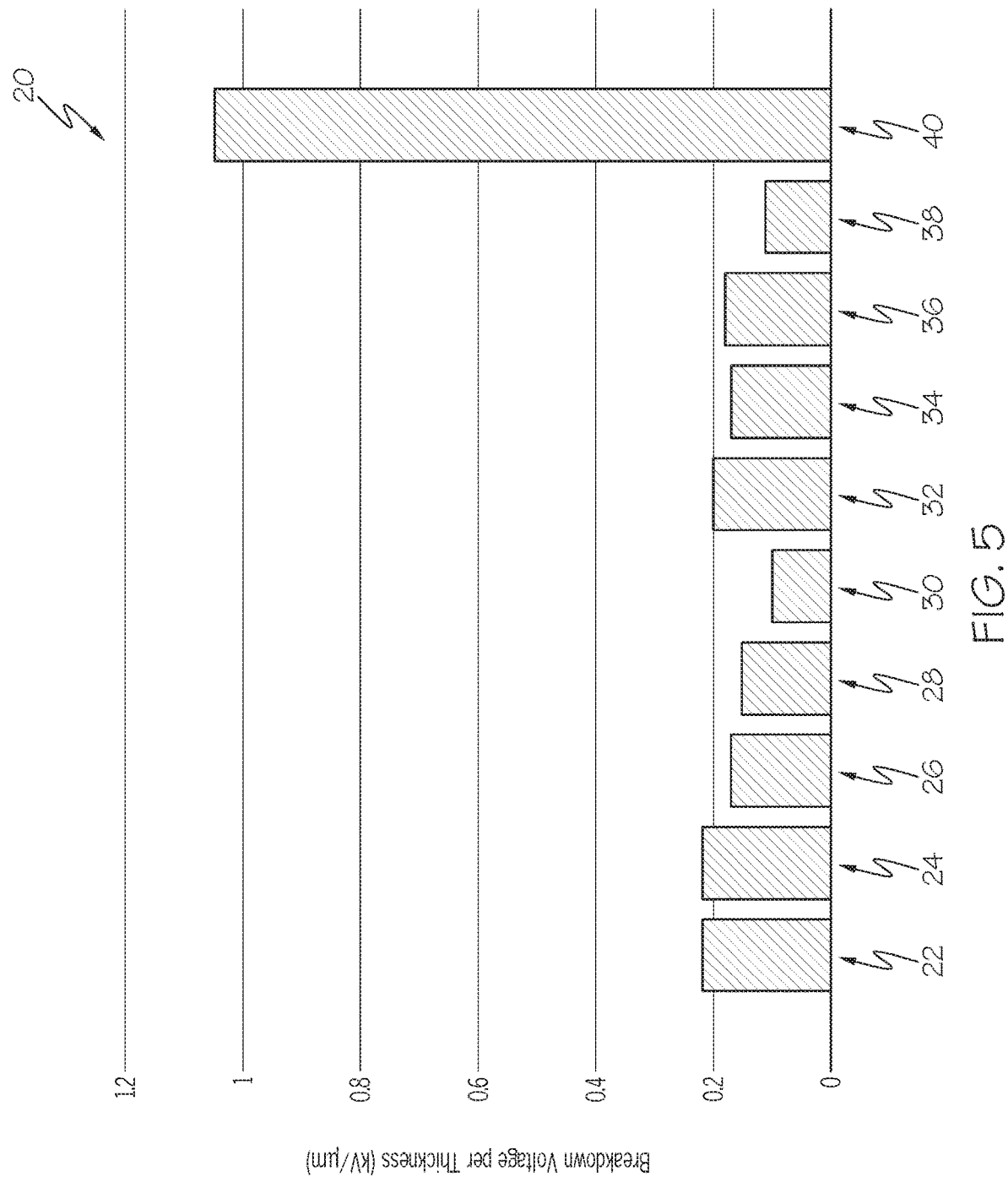

ARTIFICIAL MUSCLE ACTUATORS COMPRISING ELECTRODES WITH AN INSULATION BILAYER

TECHNICAL FIELD

The present specification generally relates to artificial muscle actuators and, more specifically, to artificial muscle actuators that include an insulation bilayer.

BACKGROUND

Artificial muscles based on electrostatics, such as more specifically HASEL artificial muscles are a promising actuator technology. One particular artificial muscle design is described in the paper titled "*Hydraulically amplified self-healing electrostatic actuators with muscle-like performance*" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). However, for practical applications, artificial muscle designs need to exert more force at lower applied voltages.

Accordingly, a need exists for improved artificial muscles that are able to apply an increased actuator force.

SUMMARY

In one embodiment, an artificial muscle actuator includes a housing, a dielectric fluid housed within the housing, and an electrode pair positioned in the housing. The electrode pair includes a first electrode and a second electrode. The first electrode and the second electrode each include a metal film. The first electrode includes an insulation bilayer disposed on the metal film of the first electrode in an orientation facing the second electrode. In addition, the insulation bilayer includes an acryl-based polymer layer disposed on the metal film and a biaxially oriented polypropylene (BOPP) layer disposed on the acryl-based polymer layer.

In another embodiment, an artificial muscle actuator includes a housing having an electrode region adjacent an expandable fluid region, a dielectric fluid housed within the housing, and an electrode pair positioned in the electrode region of the housing. The electrode pair includes a first electrode and a second electrode. The first electrode and the second electrode each include a metal film and an insulation bilayer disposed on the metal film. The insulation bilayer of the first electrode is disposed on the metal film of the first electrode in an orientation facing the second electrode. The insulation bilayer of the second electrode is disposed on the metal film of the second electrode in an orientation facing the first electrode. The insulation bilayer includes an acryl-based polymer layer disposed on the metal film and a biaxially oriented polypropylene (BOPP) layer disposed on the acryl-based polymer layer. Furthermore, the electrode pair is drawn together in response to an applied voltage, pushing the dielectric fluid into the expandable fluid region to hydraulically inflate the expandable fluid region.

In yet another embodiment, a method of actuating an artificial muscle actuator includes generating voltage using a voltage source electrically coupled to an electrode pair of the artificial muscle actuator, the artificial muscle actuator further including a housing having an electrode region and an expandable fluid region. A dielectric fluid is housed within the housing. The electrode pair is positioned in the electrode region of the housing. The electrode pair include a first electrode and a second electrode that each have a metal film. The first electrode includes an insulation bilayer disposed on the metal film of the first electrode in an orientation facing the second electrode. The insulation bilayer includes an acryl-based polymer layer disposed on the metal film and a biaxially oriented polypropylene (BOPP) disposed on the acryl-based polymer layer. The method also includes applying voltage generated by the voltage source to the electrode pair, thereby electrostatically drawing the first electrode and the second electrode together, pushing the dielectric fluid into the expandable fluid region to hydraulically inflate the expandable fluid region.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2B schematically depicts a cross-sectional view of the artificial muscle actuator of FIG. 2A in an actuated state, according to one or more embodiments shown and described herein;

FIG. 4 schematically depicts a cross-sectional view of another example electrode pair that may be used in the artificial muscle actuators of FIGS. 1A-2B, according to one or more embodiments shown and described herein; and FIG. 5 graphically depicts the breakdown voltage per thickness of example electrode insulation materials, according to one or more embodiments shown and described herein.

DETAILED DESCRIPTION

Figure 1A:
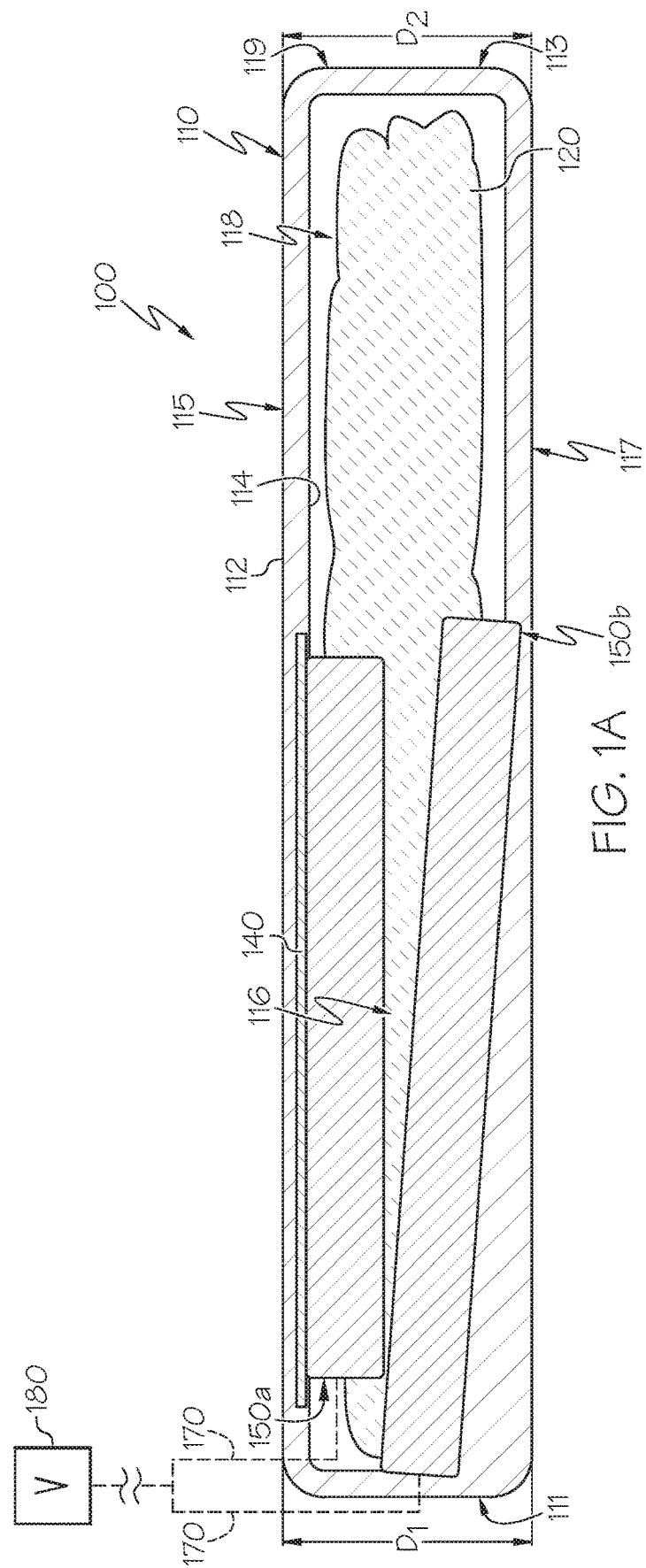
FIG. 1A schematically depicts a cross-sectional view of an example artificial muscle actuator in a non-actuated state, according to one or more embodiments shown and described herein.

Referring generally to the figures, embodiments of the present disclosure are directed to artificial muscle actuators having an electrode pair disposed in a housing with a dielectric fluid. In operation, voltage may be applied to the electrode pair, drawing the electrode pair together, which directs dielectric fluid into an expandable fluid region of the housing, expanding the expandable fluid region of the housing. This expansion may apply an actuator force in a number of different settings, such as robotics, medical devices, vehicles, or the like. Furthermore, at least one of the electrodes of the electrode pair comprises an insulation bilayer. In particular, the insulation bilayer of the at least one electrode of the electrode pair comprises an acryl-based polymer layer, such as poly(ethyl acrylate acrylamide), and a biaxially oriented polypropylene (BOPP) layer. The acryl-based polymer layer is disposed on a metal film of the electrode and the BOPP layer is disposed on the acryl-based polymer layer. The insulation bilayer of the electrodes described herein have a high breakdown voltage per thickness and thus facilitate the formation of thin artificial muscle actuators that are resistive to high voltage electrical breakdown and thus may operate at high voltages, facilitating an increase in achievable actuator force. Embodiments of artificial muscles actuators with electrodes having an insulation bilayer will now be described and, whenever possible, the same reference numerals will be used throughout the drawings to refer to the same or like parts.

Figure 1B:
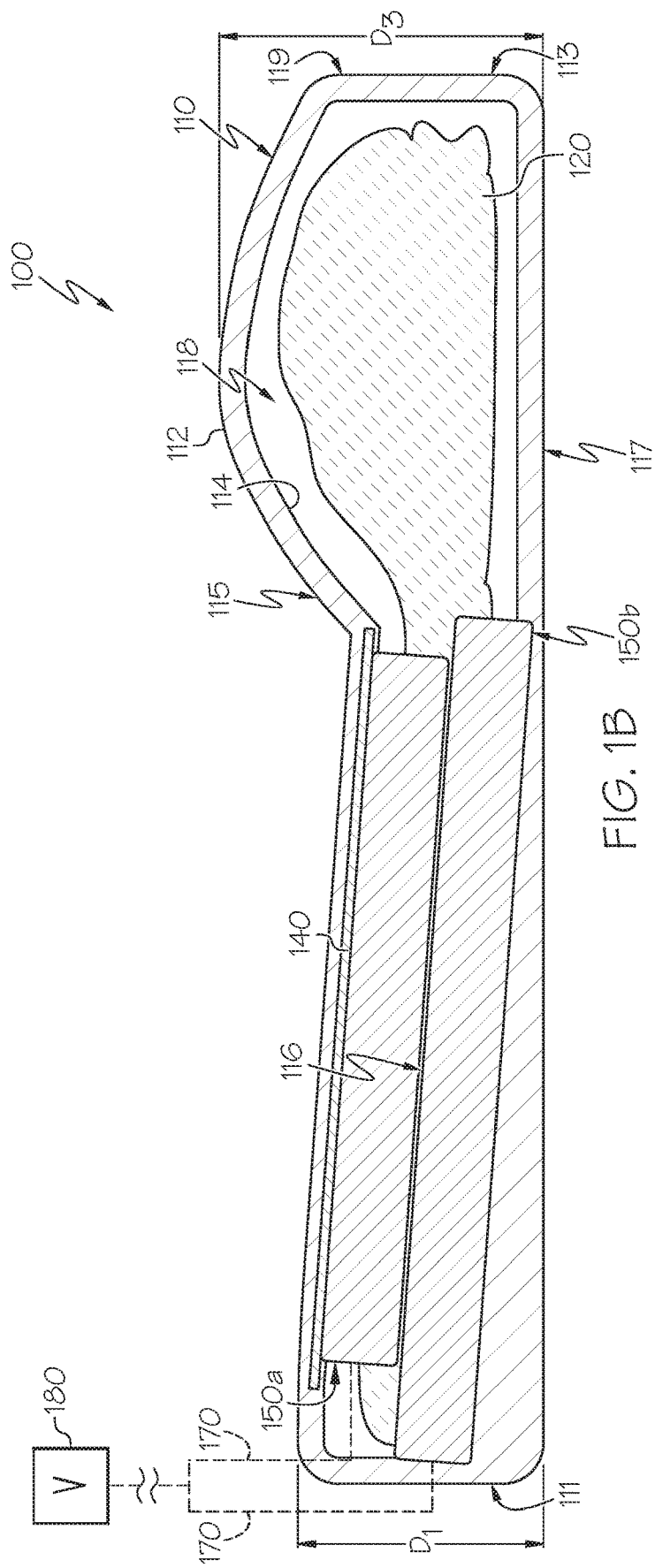
FIG. 1B schematically depicts a cross-sectional view of the artificial muscle actuator of FIG. 1A in an actuated state, according to one or more embodiments shown and described herein.
Figure 2A:
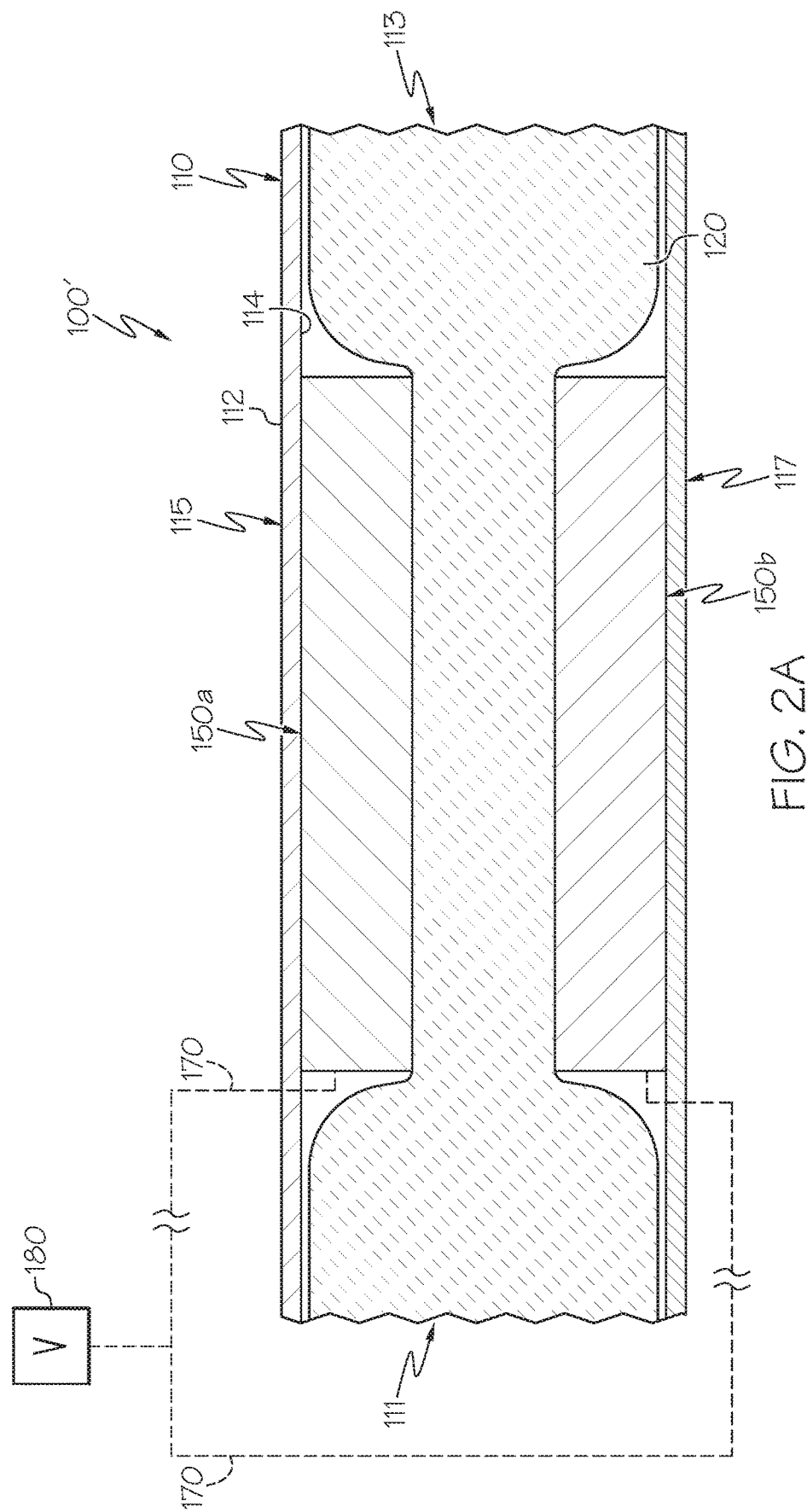
FIG. 2A schematically depicts a cross-sectional view of another example artificial muscle actuator in a non-actuated state, according to one or more embodiments shown and described herein.

Referring now to FIGS. 1A-2B, embodiments of an artificial muscle actuator 100, 100' are depicted in a non-actuated state (FIGS. 1A and 2A) and an actuated state (FIGS. 1B and 2B). The artificial muscle actuator 100, 100' comprises a housing 110 and a pair of electrodes 150 disposed within the housing 110. The pair of electrodes 150 comprise a first electrode 150a and a second electrode 150b. The pair of electrodes 150, including the first electrode 150a and the second electrode 150b, are provided within an electrode region 116 of the housing 110, adjacent an expandable fluid region 118 of the housing 110. In the embodiments of the artificial muscle actuator 100 depicted in FIGS. 1A and 1B, the electrode region 116 is disposed at a first end 111 of the housing 110 and the expandable fluid region 118 disposed at a second end 113 of the housing 110. In the embodiments of the artificial muscle actuator 100' depicted in FIGS. 2A and 2B, the electrode region 116 is centrally disposed between expandable fluid regions 118 positioned at both the first end 111 and the second end 113 of the housing 110. It should be understood that the artificial muscle actuators 100, 100' provide non limiting examples of artificial muscles that may include the electrode designs described herein. That is, electrodes 250a 250b, 350a, 350b that include an metal film 252 and an insulation bilayer 254 having an acryl-based polymer layer 256 and a biaxially oriented polypropylene (BOPP) layer 258 described in more detail below with respect to FIGS. 3-5.

In some embodiments, the housing 110 comprises a flexible material and is a flexible housing. For example, the flexible housing may comprise an elastomeric material such that it is an elastomeric housing. The housing 110 comprises an outer surface 112 opposite an inner surface 114 and is formed of one or more walls (which may be coupled together or integral with one another). For example, the housing 110 comprises a first wall 115 opposite a second wall 117 (depicted in the artificial muscle actuators 100 and 100' of FIGS. 1A-2B) and a sidewall 119 extending between the first wall 115 and the second wall 117 at both the first end 111 and the second end 113 of the housing 110 (depicted in the artificial muscle actuator 100 of FIGS. 1A and 1B).

Referring still to FIGS. 1A-2B, one of the first electrode 150a and the second electrode 150b is a negatively charged electrode and the other of the first electrode 150a and the second electrode 150b is a positively charged electrode. For purposes discussed herein, either electrode 150a, 150b may be positively charged so long as the other electrode 150a, 150b within the artificial muscle actuator 100, 100' is negatively charged. The electrode pair 150 of the artificial muscle actuator 100 is electrically coupled to a voltage source 180, for example, using leads 170. In operation, applying voltage generated by the voltage source 180 to the electrode pair 150 forms an electrical potential across the first electrode 150a and the second electrode 150b. This electrical potential causes electrostatic attraction between the first electrode 150a and the second electrode 150b, drawing the first electrode 150a and the second electrode 150b together.

In addition to an electrode pair 150, the housing 110 houses a dielectric fluid 120. Without intending to be limited by theory, the dielectric fluid 120 is a medium or material that transmits electrical force with minimal to no conduction and as such has low electrical conductivity. Some non-limiting example dielectric fluids 120 include perfluoroalkanes, transformer oils, and deionized water. The dielectric fluid 120 minimizes unwanted electrical discharges (i.e., shorts) between the electrode pair 150. In addition, the dielectric fluid 120 is disposed between the first electrode 150a and the second electrode 150b when the artificial muscle actuator 100, 100' is in a non-actuated state (FIGS. 1A and 2A). When voltage is applied to the electrode pair 150, the first electrode 150a and the second electrode 150b are drawn together to actuate the artificial muscle actuator 100, 100' and push the dielectric fluid 120 into the expandable fluid region 118 of the housing 110.

In the non-actuated state of the artificial muscle actuator 100, shown in FIG. 1A, the electrode region 116 has a height substantially equal to a height of the expandable fluid region 118. In the actuated state of the artificial muscle actuator 100, shown in FIG. 1B, the expandable fluid region 118 has a greater height than the electrode region 116. In the non-actuated state (FIG. 1A), the outer surface 112 of the housing 110 along both the first wall 115 and the second wall 117 of the housing 110 are planar and substantially parallel to one another. More particularly, a first distance D1 between the outer surface 112 of the housing 110 along the first wall 115 and the second wall 117 within the electrode region 116 is substantially equal to a second distance D2 between the outer surface 112 of the housing 110 along the first wall 115 and the second wall 117 within the expandable fluid region 118. In the actuated state (FIG. 1B) the first electrode 150a and the second electrode 150b are brought into contact with one another.

Thus, the first electrode 150a and the second electrode 150b are now substantially parallel to one another. However, when in the actuated state, the outer surface 112 along the first wall 115 of the housing 110 within the electrode region 116 is not parallel to the outer surface 112 along the second wall 117 of the housing 110. More particularly, the first distance D1 between the outer surface 112 along the first wall 115 and the outer surface 112 along the second wall 117 within the electrode region 116 is less than a third distance D3 between the outer surface 112 along of the first wall 115 and the outer surface 112 along the second wall 117 within the expandable fluid region 118. The difference between the second distance D2 and the third distance D3 defines the amount of expansion of the first wall 115 of the housing 110 within the expandable fluid region 118 by the displaced dielectric fluid 120.

In some embodiments, as depicted in FIGS. 1A and 1B the first electrode 150a and the second electrode 150b are arranged such that a distance between the first electrode 150a and the second electrode 150b is closer nearer the first end 111 of the housing 110 than the second end 113 of the housing. This positions the first electrode 150a and the second electrode 150b in an acute or V-shape configuration. As a result, when actuated, the electrodes 150a, 150b are configured to zipper toward one another, pushing the dielectric fluid 120 toward the expandable fluid region 118 and the second end 113 of the housing 110. This pushes the dielectric fluid 120 from the first end 111 of the housing 110 toward the second end 113 and into the expandable fluid region 118. Pressure from the dielectric fluid 120 against the first wall 115 (and/or the second wall 117) of the housing 110 in the expandable fluid region 118 causes the first wall 115 (and/or the second wall 117) to deform (i.e., expand). Once the voltage being applied to the first electrode 150a and the second electrode 150b is discontinued, the electrodes 150a, 150b return to their initial position (non-parallel position in FIG. 1A) and the outer surface 112 along both the first wall 115 and the second wall 117 returns to its initial position (parallel position in FIG. 1A). In some embodiments, as show in FIGS. 1A and 1B, a stiffening film 140 is provided between the first electrode 150a and the first wall 115 of the housing 110. The stiffening film 140 provides rigidity for at least a portion of the first wall 115 when operating between the non-actuated state and the actuated state and the first electrode 150a is moved toward the second electrode 150b and the second wall 117. In some embodiments, the stiffening film 140 may be an acetate film.

Referring now to FIGS. 2A and 2B, actuation of the artificial muscle actuator 100' is similar to actuation of the artificial muscle actuator 100 of FIGS. 1A and 1B. However, in FIGS. 2A and 2B, the electrodes 150a, 150b are substantially parallel in both the non-actuated state (FIG. 2A) and the actuated state (FIG. 2B). Electrostatically drawing the electrodes 150a, 150b together in FIGS. 2A and 2B directs dielectric fluid outward from the electrode region 116 into one or more expandable fluid regions 118, expanding the expandable fluid regions 118. It should be understood that FIGS. 2A and 2B are included to illustrate another design of an artificial muscle actuator that may include the electrode designs described herein. That is, electrodes 250a 250b, 350a, 350b that include the metal film 252 and the insulation bilayer 254 having the acryl-based polymer layer 256 and the biaxially oriented polypropylene (BOPP) layer 258 described in more detail below with respect to FIGS. 3-5.

Figure 3:
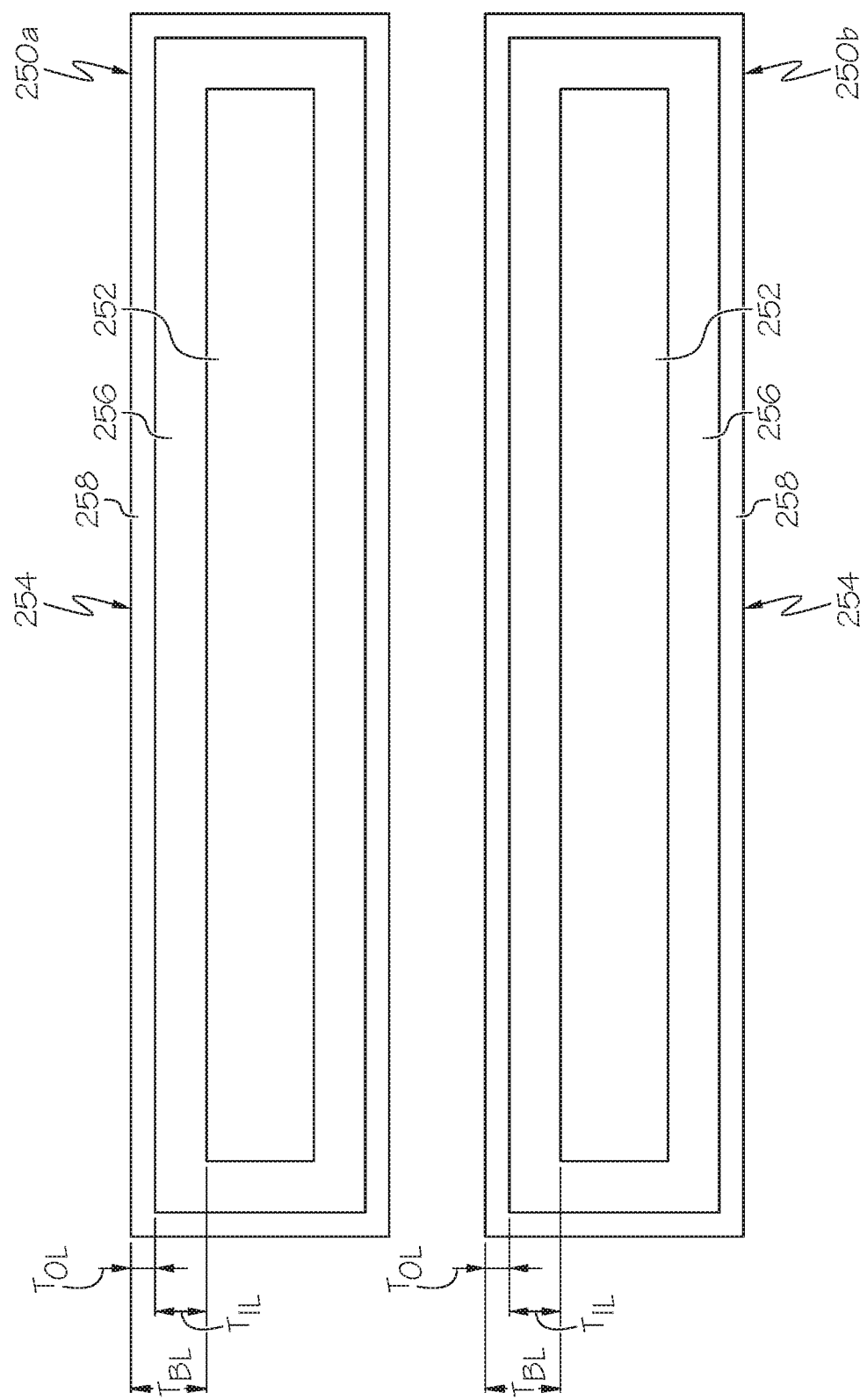
FIG. 3 schematically depicts a cross-sectional view of an example electrode pair that may be used in the artificial muscle actuators of FIGS. 1A-2B, according to one or more embodiments shown and described herein.

Referring now to FIGS. 3 and 4, two embodiments of electrode pairs that may be used in the artificial muscle actuators 100, 100' of the FIGS. 1A-2B are schematically depicted. FIG. 3 depicts a first electrode 250a and a second electrode 250b and FIG. 4 depicts a first electrode 350a and a second electrode 350b. Both electrodes 250a, 250b of FIG. 3 and electrodes 350a, 350b of FIG. 4 comprise a metal film 252 and an insulation bilayer 254 disposed on the metal film 252. Furthermore, both electrodes 250a, 250b of FIG. 3 and electrodes 350a, 350b are configured such that the insulation bilayer 254 of the first electrode 250a, 350a is disposed on the metal film 252 of the first electrode 250a, 350a in an orientation facing the second electrode 250b, 350b. As one example, in the FIG. 3, the insulation bilayer 254 of the first electrode 250a surrounds the metal film 252 of the first electrode 250a and thus a portion of the insulation bilayer 254 of the first electrode 250a faces the second electrode 250b. In FIG. 3, the second electrode 250b also comprises an insulation bilayer 254 which surrounds the metal film 252 of the second electrode 250b and thus a portion of the insulation bilayer 254 of the second electrode 250b faces the first electrode 250a. As another example, in FIG. 4, the insulation bilayer 254 of the first electrode 350a is disposed on a surface of the metal film 252 of the first electrode 350a that faces the second electrode 350b but does not surround the metal film 252. In FIG. 4, the second electrode 250b also comprises an insulation bilayer 254 which is disposed on a surface of the metal film 252 of the second electrode 250b that faces the first electrode 350a but does not surround the metal film 252.

Furthermore, while both electrodes 250a, 250b of FIG. 3 and electrodes 350a, 350b of FIG. 4 comprise the metal film 252 and the insulation bilayer 254 disposed on the metal film 252, it should be understood that embodiments are contemplated in which the insulation bilayer 254 is disposed on only one of the two electrodes 250a, 250b and 350a 350b of each electrode pair. Indeed, a single insulation bilayer 254, if coupled to one electrode (e.g., 250a, 350a) in an orientation facing the other electrode (e.g., 350a, 350b), provides insulative separation between the pair of electrodes (250a, 250b, 350a, 350b).

Referring still to FIGS. 3 and 4, the insulation bilayer 254 comprises an acryl-based polymer layer 256 disposed on the metal film 252 and a biaxially oriented polypropylene (BOPP) layer 258 disposed on the acryl-based polymer layer 256. The acryl-based polymer layer 256 is an adhesive layer (e.g., an acrylic adhesive emulsion) adhered to both the metal film 252 and the BOPP layer 258. In some embodiments, the acryl-based polymer layer 256 comprises a poly (ethyl acrylate acrylamide). However, it should be understood acryl-based polymer materials are contemplated, such as mono(ethylacrylate acrylamide), poly(methylacrylate acrylamide), mono(methylacrylate acrylamide), poly(proprylacrylate acrylamide), mono(proprylacrylate acrylamide), poly(butylacrylate acrylamide), mono(butylacrylate acrylamide), poly(pentylacrylate acrylamide), mono(pentylacrylate acrylamide), poly(hexylacrylate acrylamide), mono(hexylacrylate acrylamide), or the like. Furthermore, the metal film 252, which may be a flexible metal film, may comprise aluminum or copper. However, it should be understood that any suitable metals for forming an electrode are contemplated. In addition, it should be understood that additional interlayers may be positioned between the insulation bilayer 254 and the metal film 252 and that additional interlayers may be positioned between the insulation bilayer 254 and the housing 110.

Referring still to FIGS. 3 and 4, the insulation bilayer 254 may comprise a thickness $T_{BL}$ of 50 μm or less, such as 45 μm or less, 40 μm or less, 35 μm or less, 30 μm or less, 25 μm or less, 20 μm or less, 15 μm or less, 10 μm or less, 5 μm or less, or any range having any two of these thicknesses as endpoints. As depicted in FIGS. 3 and 4, the acryl-based polymer layer 256 comprises a thickness $T_{IL}$ and the BOPP layer 258 comprises a thickness $T_{OL}$. In some embodiments, the thickness $T_{IL}$ of the acryl-based polymer layer 256 is greater than the thickness $T_{OL}$ of the BOPP layer 258, for example 1.5-10 times thicker, such as 2-5 times thicker.

Referring now to FIG. 5, a graph 20 graphically depicts the breakdown voltage per thickness (kV/μm) of example electrode insulation materials (e.g., example insulation bilayers) to illustrate the effectiveness of the insulation bilayer 254 comprising the acryl-based polymer layer 256 and the BOPP layer 258 in comparison to other insulation materials. Graph 20 includes 11 bars (bars 22-40) that depicts the breakdown voltage per thickness of 10 comparative electrode insulation materials (bars 22-38) and the insulation bilayer 254 (bar 40) comprising the acryl-based polymer layer 256 and the BOPP layer 258.

Bar 22 shows that a 25.4 μm thick insulation bilayer of Kapton® (e.g., polyimide) with an acrylic adhesive has a breakdown voltage per thickness of 0.22 kV/μm. Bar 24 shows that a 25.4 μm thick insulation bilayer of Kapton® with a silicone adhesive has a breakdown voltage per thickness of 0.22 kV/μm. Bar 26 shows that a 50.8 μm thick insulation bilayer of Kapton® with a silicone adhesive has a breakdown voltage per thickness of 0.18 kV/μm. Bar 28 shows that a 76.2 μm thick insulation bilayer of Ultem®

(e.g., polyetherimide) with an acrylic adhesive has a breakdown voltage per thickness of 0.16 kV/μm. Bar 30 shows that a 127 μm thick insulation bilayer of Ultem® with an acrylic adhesive has a breakdown voltage per thickness of 0.1 kV/μm. Bar 32 shows that a 50.8 μm thick insulation bilayer of High Density Teflon® (e.g., polytetrafluoroethylene (PTFE)) with a silicone adhesive has a breakdown voltage per thickness of 0.2 kV/μm. Bar 34 shows that a 50.8 μm thick insulation bilayer of Teflon® with a silicone adhesive has a breakdown voltage per thickness of 0.18 kV/μm. Bar 36 shows that a 63.5 μm thick insulation bilayer of tensilized Teflon® with a silicone adhesive has a breakdown voltage per thickness of 0.19 kV/μm. Bar 38 shows that a 76.2 μm thick insulation bilayer of Teflon® with a silicone adhesive has a breakdown voltage per thickness of 0.12 kV/μm.

Thus, each of the insulation bilayers represented by bars 22-38 have a breakdown voltage per thickness of 0.1-0.22 kV/μm. In contrast, bar 40 shows that a 19 μm thick insulation bilayer 254 comprising the acryl-based polymer layer 256 (having a thickness of 13.4 μm) and the BOPP layer 258 (having a thickness of 3.95 μm) has a breakdown voltage per thickness of 1.04 kV/μm. This represents a greater than fourfold increase in breakdown voltage per thickness of the best comparative insulator bilayer represented by bars 22-38. This also shows that the breakdown voltage per thickness of the insulation bilayer 254 is 1 kV/μm or greater.

By using the insulation bilayer 254 comprising the acryl-based polymer layer 256 and the BOPP layer 258, the thickness $T_{BL}$ of the insulator bilayer 254 may be reduced while simultaneously increasing the electrical breakdown voltage of the insulator bilayer 254 such that the artificial muscle actuator 100, 100' may be operated at increased voltages without shorting out, facilitating the formation of more powerful artificial muscles actuators. For example, the insulation bilayer 254 is resistant to breakdown at voltages of 10 kV or greater, such as 11 kV or greater, 12 kV or greater, 15 kV or greater, 20 kV or greater, or the like. Indeed, the increased breakdown voltage per thickness of the insulation bilayer 254 allows a single insulation bilayer 254 to provide sufficient insulative separation between the pair of electrodes (250a, 250b and 350a, 350b). Without intending to be limited by theory, in operation, the actuator force applied by the artificial muscles actuator 100, 100' is inversely proportional to the thickness $T_{BL}$ of the insulation bilayer 254 and directly proportional to the applied voltage squared. Thus, reducing the thickness of the insulation bilayer 254 while using materials that are resistant electrical shorting under large applied potentials, such as the acryl-based polymer layer 256 and the BOPP layer 258, facilitates an increase in the achievable actuator force.

It should now be understood that embodiments described herein are directed to artificial muscle actuators having an electrode pair in which at least one electrode comprises an insulation bilayer that includes an acryl-based polymer layer, such as poly(ethyl acrylate acrylamide), and a BOPP layer. The insulation bilayer has a high breakdown voltage per thickness and thus facilitates the formation of thin artificial muscle actuators that are resistive to high voltage electrical breakdown such that they may operate with at higher voltages, facilitating an increase in achievable actuator force.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An artificial muscle actuator comprising:
   a housing;
   a dielectric fluid housed within the housing; and
   an electrode pair positioned in the housing, wherein:
   the electrode pair comprises a first electrode and a second electrode;
   the first electrode and the second electrode each comprise a metal film, the metal film of the first electrode including a first surface and an opposite second surface, the first surface facing the second electrode;
   the first electrode comprises an insulation bilayer disposed on the first surface and the second surface of the metal film of the first electrode; and
   the insulation bilayer comprises an acryl-based polymer layer disposed on the metal film and a biaxially oriented polypropylene (BOPP) layer disposed on the acryl-based polymer layer.

2. The artificial muscle actuator of claim 1, wherein the acryl-based polymer layer comprises a poly(ethyl acrylate acrylamide).

3. The artificial muscle actuator of claim 1, wherein the acryl-based polymer layer is an adhesive layer adhered to the metal film and the BOPP layer.

4. The artificial muscle actuator of claim 1, wherein the second electrode comprises an insulation bilayer disposed on the metal film of the second electrode in an orientation facing the second electrode.

5. The artificial muscle actuator of claim 1, wherein the insulation bilayer surrounds the metal film of the first electrode.

6. The artificial muscle actuator of claim 5, wherein the second electrode comprises an insulation bilayer that surrounds the metal film of the second electrode.

7. The artificial muscle actuator of claim 1, wherein the insulation bilayer is resistant to breakdown at voltages of 11 kV or greater.

8. The artificial muscle actuator of claim 1, wherein a breakdown voltage per thickness of the insulation bilayer is 1 kV/μm or greater.

9. The artificial muscle actuator of claim 1, wherein the metal film of the first electrode and the second electrode comprises a flexible metal film.

10. An artificial muscle actuator comprising:
    a housing comprising an electrode region adjacent an expandable fluid region;
    a dielectric fluid housed within the housing; and
    an electrode pair positioned in the electrode region of the housing, wherein:
    the electrode pair comprises a first electrode and a second electrode;
    the first electrode and the second electrode each comprise a metal film and an insulation bilayer disposed on the metal film, the metal film of the first electrode includes a first surface and an opposite second surface, the first surface facing the second electrode;

the insulation bilayer of the first electrode is disposed on first surface and the second surface of the metal film of the first electrode;

the insulation bilayer of the second electrode is disposed on the metal film of the second electrode in an orientation facing the first electrode;

the insulation bilayer comprises an acryl-based polymer layer disposed on the metal film and a biaxially oriented polypropylene (BOPP) layer disposed on the acryl-based polymer layer; and the electrode pair is drawn together in response to an applied voltage, pushing the dielectric fluid into the expandable fluid region to hydraulically inflate the expandable fluid region.

11. The artificial muscle actuator of claim 10, wherein the housing is a flexible housing comprising an elastomeric material.

12. The artificial muscle actuator of claim 10, further comprising a stiffening film between one of the first or second electrodes and the housing.

13. The artificial muscle actuator of claim 10, wherein the acryl-based polymer layer comprises a poly(ethyl acrylate acrylamide).

14. The artificial muscle actuator of claim 10, wherein a breakdown voltage per thickness of the insulation bilayer is 1 kV/µm or greater.

15. A method of actuating an artificial muscle actuator, the method comprising:

generating voltage using a voltage source electrically coupled to an electrode pair of the artificial muscle actuator, the artificial muscle actuator further comprising a housing having an electrode region and an expandable fluid region; wherein:

a dielectric fluid is housed within the housing;

the electrode pair is positioned in the electrode region of the housing;

the first electrode and the second electrode each comprise a metal film, the metal film of the first electrode includes a first surface and an opposite second surface, the first surface facing the second electrode;

the first electrode comprises an insulation bilayer disposed on the first surface and the second surface of the metal film of the first electrode; and the insulation bilayer comprises an acryl-based polymer layer disposed on the metal film and a biaxially oriented polypropylene (BOPP) disposed on the acryl-based polymer layer; and applying voltage generated by the voltage source to the electrode pair, thereby electrostatically drawing the first electrode and the second electrode together, pushing the dielectric fluid into the expandable fluid region to hydraulically inflate the expandable fluid region.

16. The method of claim 15, further comprising removing voltage from the electrode pair, thereby removing electrostatic attraction between the electrode pair such that the dielectric fluid flows away from the expandable fluid region.

17. The method of claim 15, wherein the voltage applied to the electrode pair comprises 11 kV or greater.

18. The method of claim 15, wherein a breakdown voltage per thickness of the insulation bilayer is 1 kV/µm or greater.

19. The method of claim 15, wherein the second electrode comprises an insulation bilayer disposed on the metal film of the second electrode in an orientation facing the second electrode.

* * * * *